(12) United States Patent
Berstis

(10) Patent No.: US 7,142,337 B2
(45) Date of Patent: Nov. 28, 2006

(54) METHOD FOR GENERATING A HOLOGRAM ON A DISC SURFACE

(75) Inventor: Viktors Berstis, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 642 days.

(21) Appl. No.: 10/427,131

(22) Filed: Apr. 30, 2003

(65) Prior Publication Data

US 2004/0218237 A1  Nov. 4, 2004

(51) Int. Cl.
    G03H 1/02 (2006.01)
(52) U.S. Cl. .................. 359/3; 369/103; 365/215; 365/216
(58) Field of Classification Search ............. 359/3; 369/103; 365/215, 216
    See application file for complete search history.

(56) References Cited

U.S. PATENT DOCUMENTS

| | | | |
|---|---|---|---|
| 6,423,478 B1 * | 7/2002 | Ha | 430/321 |
| 6,674,554 B1 * | 1/2004 | Hart | 359/25 |
| 2005/0232125 A1 * | 10/2005 | Kuroda et al. | 369/125 |

* cited by examiner

Primary Examiner—Andrea Wellington
Assistant Examiner—Linh Nguyen
(74) Attorney, Agent, or Firm—Cardinal Law Group

(57) ABSTRACT

A method for generating a hologram on a disc surface provides for the use of calibration spots burned onto a disc with an accuracy greater than one half wavelength of light.

14 Claims, 8 Drawing Sheets

METHOD FOR GENERATING A HOLOGRAM ON A DISC SURFACE

FIELD OF THE INVENTION

The present invention relates generally to data storage disc and disc drives for reading and recording data on data storage discs. More specifically, the invention relates to a method for generating a hologram on a data storage disc.

BACKGROUND OF THE INVENTION

Data storage discs, such as that shown at 10 in FIG. 2, store a diverse array of data including music, movies and educational material. Currently images stored on such data storage discs are only accessible during playback of the disc in an appropriate disc drive. Such images may include logos, advertising and other images related to the data on the disc, e.g., a data storage disc containing music data may, during playback, include images related to the music. Images related to the data on the disc may also be displayed on packaging for the disc. e.g., a data storage disc containing education materials may be packaged with images related to the educational materials.

Meanwhile, holographic images ("holograms") are currently generated on a limited array of surfaces including glass, decals and films. In order to place a hologram on a non-film surface, the hologram is first generated on a film and then attached to the non-film surface. For example, to create a hologram on a plastic card, the hologram is first created on a film and then the film is attached to the card.

It would be desirable, therefore, to provide a method of generating a holographic image on a data storage disc. It would further be desirable to generate the image such that it is visible on the disc surface without requiring playback of the disc in a disc drive. It would further be desirable to generate the image directly on the disc surface without requiring that the image be generated separately and then attached to the disc.

SUMMARY OF THE INVENTION

The present invention relates to a method of generating a hologram on a disc surface. The method first provides for providing at least one calibration spot on the first disc surface, positioned within one half a wavelength of light. The method next reads the calibration spot to determine positioning, and writes a set of hologram spots that are representative of the hologram onto the disc surface at a different location.

Another aspect of the invention provides for a computer program product for generating a hologram on a disc surface. The computer program product comprises means for providing at least one calibration spot on the disc surface, positioned within one half a wavelength of light. The computer program product further comprises means for reading the calibration spot for positioning means for writing a set of hologram spots that are representative of the hologram onto a disc surface based on position.

Yet another aspect of the invention provides for a system for generating a hologram on a first disc surface. The system comprises a disc surface that comprises at least one calibration spot positioned with an accuracy of one half a wavelength of light. The system further comprises a disc-writing unit that comprises means for writing a set of hologram spots that are representative of the first portion of the hologram onto a second disc surface based on the position of the at least one calibration spot.

The foregoing forms as well as other forms, features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
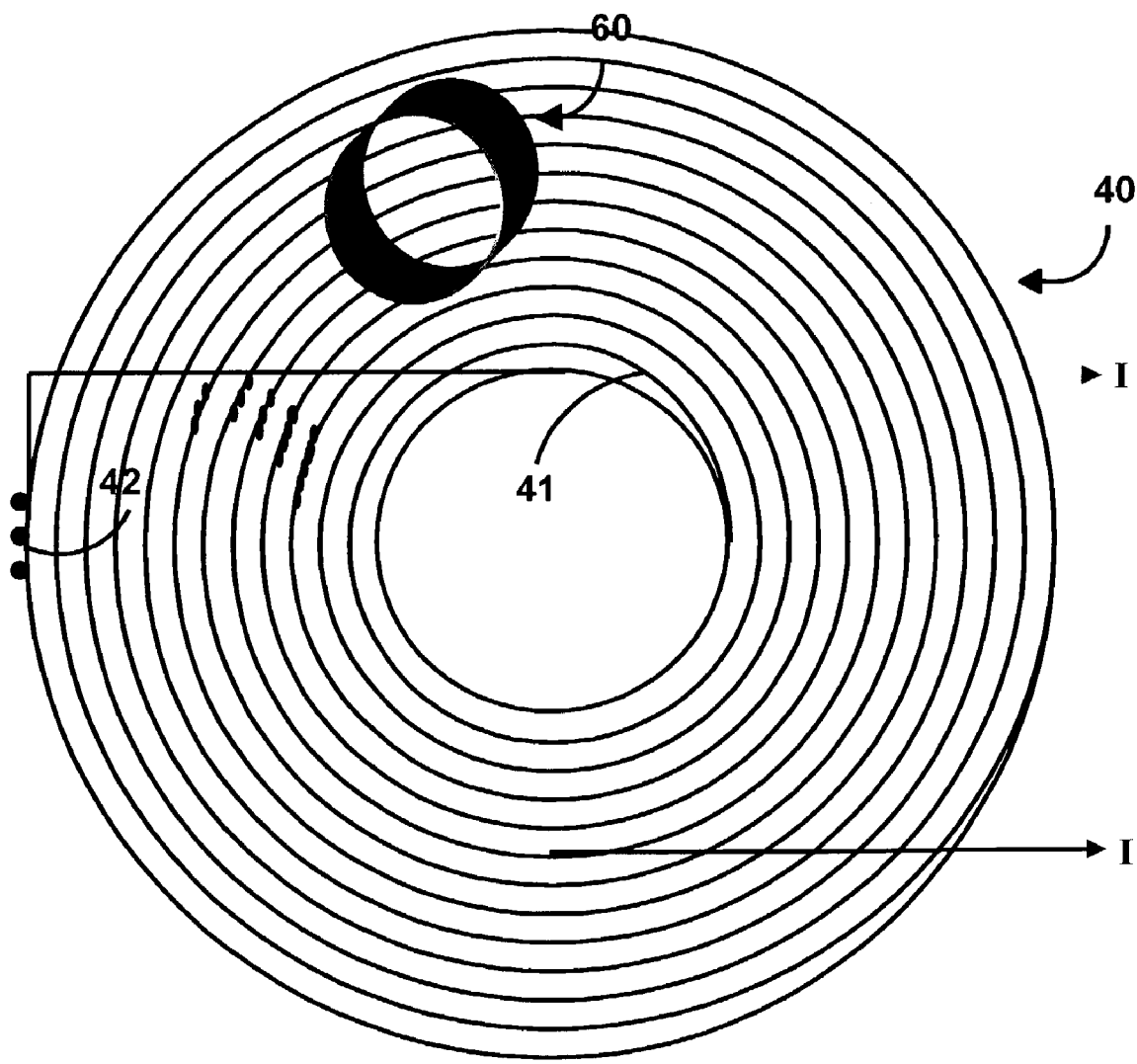
FIG. 1 illustrates a top view of a first embodiment of optical disc in accordance with the present invention.

FIG. 1 illustrates an optical or data storage disc 40 in accordance with one embodiment of the present invention. Disc 40 ("CD 40") may be, for example, a CDR, a CDRW, a DVD-R, a DVD-RW, a DVD+R, a DVD+RW, a DVDRAM, a DVDROM, and others as known in the art. CD 40 of FIG. 1 may be compared with a prior art data storage disc 10 as illustrated in FIG. 2.

In addition, FIG. 1 shows a simplified three-dimensional image 60. Image 60 may be, for example, a holographic image generated with conventional optical techniques or computational techniques. In such an optical technique, a laser beam is split in two, with one part shining directly at a large sheet of film and the other bouncing off the object in question before being rejoined with the first beam on the film. On the film, the overlapping beams etch diffraction patterns that contain enough information to render a reproduction of the light wavefront from the object recorded. This permits the entire image to be seen when illuminated with a portion of the original wavefront (usually the beam coming directly from the laser), which causes the full original wavefront to be reproduced. Thus it can be viewed from different angles creating the proper parallax effects, as in real life. When a holographic image 60 is viewed on the developed film, each eye sees a slightly different view of the image, providing the 3-D illusion. Those skilled in the art of hologram construction are familiar with techniques for reconstructing wavefronts. Those skilled in the art are further familiar with computing holograms by summing the rays of reflected light to determine the diffraction pattern to create the desired hologram. Using the method of the current invention, the image 60 may be recreated from the diffraction of incident light by carefully positioned dots burned onto disc 40. The dots are burned onto the disk by a laser beam in a disk drive specifically designed to do so, which is the subject of this invention.

Figure 2:
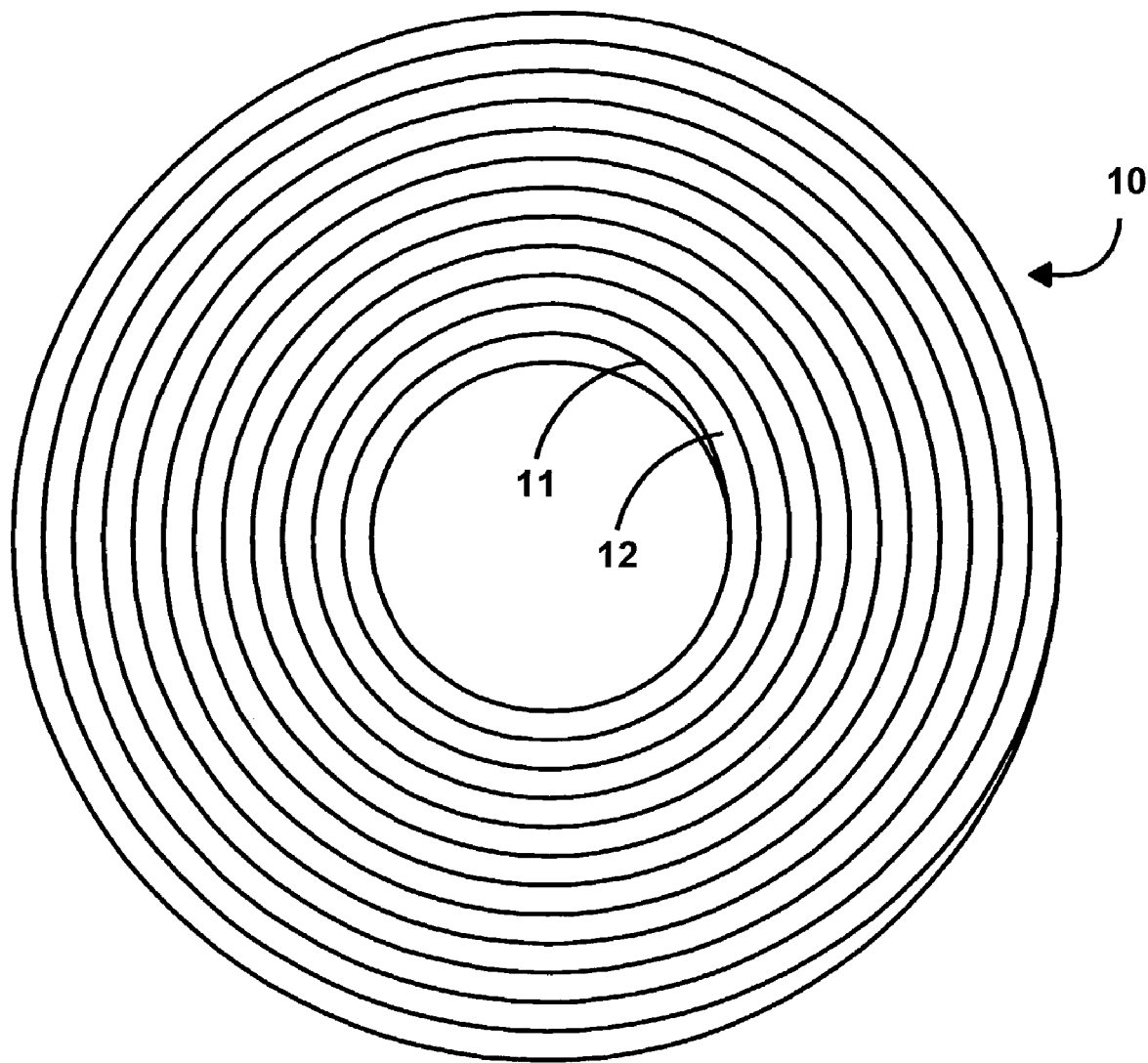
FIG. 2 illustrates a top view of an optical disc as known in the prior art.

FIG. 2 illustrates a prior art data storage disc 10. Using a method known in the art as constant linear velocity ("CLV"), a CD disc drive ("CD drive") as known in the art decreases the rotation speed of disc 10 whenever reading data from the disc 10 or writing data to the disc 10 in a direction from the center of disc 10 toward the perimeter of disc 10. Typically, a laser is used to heat the material along a spiral 11 that results in a formation of spots where the reflectivity to light is different from that of the surrounding area 12. The presence or absence of these spots along a conventional spacing on the spiral 11 is used to encode data to be stored on the disc 10. To facilitate the writing of data, the disc 10 may include a conventionally stamped spiral 11 (sometimes also called a pre-groove) extending from a center of the disc 10 to the perimeter of the disc 10. The spiral 11 has a slight continuous wobble whereby a signal is modulated on the frequency of the wobble. The signal indicates the current position along spiral 11 and is used as a calibration signal to control the motor spinning the disc 10 so that a CLV is maintained while writing data on the disc 10. This primary information modulated onto the wobble of the track is known as the Absolute Time In Pre-groove (ATIP). The signal may also indicate additional information, which informs the drive about the optimum writing parameters for the kinds of materials used in the recordable disc 10. Using the ATIP, the motor control can spin the disc 10 at the proper angular rate so that a constant and relatively predictable velocity is maintained while following the prestamped spiral 11. Thus the proper data capacity of disc 10 can be ensured (the spiral 11 is not used up too fast because of too high a velocity, or the spots creating the spiral 11 are not too close to each other due to too low a velocity. Neither the signal encoded in the wobble, nor the wobble itself is required for reading data stored on the disc 10. The CD recording drive will emit a laser beam to read modulation information on the spiral 11 whereby the CD drive can calculate the position of the write head along spiral 11. However, the positioning information provided by the ATIP is much more coarse than one half of the wavelength of light, and thus is not sufficient to accurately control the burning of dots on the disk to form a viewable hologram.

Returning now to FIG. 1, the disc 40 of the present invention also comprises a spiral 41 spiraling from a center of optical disc 40 to the perimeter of the optical disc 40.

Not only may this spiral 41 be used to facilitate the reading and writing of data as conventionally described above, but the spiral 41 may also be used to reproduce holographic image 60 onto the surface of optical disc 40. In order to recreate image 60 on the surface of optical disc 40 in accordance with the present invention, a plurality of calibration spots 42 are formed along any portion of spiral 41 by any known technique. Preferably, the calibration spots 42 are stamped along the spiral 41 on the outermost revolution ("the last revolution") of the spiral 41. The accuracy of the positioning of the calibration spots 42 is such that the position along the entire spiral can be determined with accuracy better than one-half of a wavelength of light. The calibration spots 42 could also be placed elsewhere, for example closer to the center, but they would need to be more accurately placed to achieve sufficient accuracy across the entire disk and might require the use of a higher frequency laser to achieve that accuracy. Furthermore, the revolutions of the spiral are accurately stamped from the innermost revolution to the outermost at predictable radial distances accurate to at least one half of the wavelength of light. Thus the radial distance and angular position can be sufficiently accurately determined over the entire writing surface of the disk.

Holograms may be thought of as a complex diffraction grating, which diffract light in a way that constructively interferes to form a wavefront representative from light reflected from a three dimensional scene. One can think of a hologram as a statistical process where many diffraction points are arranged such that the constructive interference of the light diffracting from these points, form the image desired while all other interferences combine to leave a noise level much lower than the signal of the desired image. Thus, if diffraction points could be placed at the proper places on a surface such as a CD 40, then a hologram of image 60 could be written on a CDR or other recordable digital disc. Those skilled in the art of hologram writing will appreciate the benefits attendant to calculating the hologram prior to writing the hologram spots so that the precalculated data may be simply accessed during writing, rather than calculated during writing the hologram spots. However, the invention is practicable if the hologram is calculated during the writing, but the speed may be limited by the processing power of the computer used. Those skilled in the art will also appreciate the benefits attendant in viewing the hologram created with the invention under optimized conditions. The optimized conditions may include the use of lighting that has a sharp spectral peak, or possibly viewed with a laser. Those skilled in the art will also appreciate that some applications may benefit from the use of a volume dielectric layer filter encapsulated with the disc to selectively filter all but a predetermined, desirable frequency of light, while filtering the light in such a way that the light is permitted to pass from a selectively preferred direction so that most of the viewing light energy contributes to reconstructing the hologram. A selectively preferred direction may include a direction perpendicular to the disc.

As further seen in FIG. 1, the pits in a prerecorded CD can serve as diffraction points. A diffraction point can be a place where light is reflected with greater amplitude or lesser amplitude than the surrounding area. It can be a point where the light is phase shifted without changing the reflectivity. Any of these are sufficient alone or in combination as a tool to create a hologram. In a recordable CD, the places where the laser alters the reflectivity of the surface are called "spots". The CD provides a spiral track on which diffraction points can be placed selectively such that they would provide the required diffraction of light to form a hologram of image 60. A writing of spots representative of the hologram onto the CD 40 requires a precision of one-half the wavelength of light, or smaller, in ascertaining the writing position of a write head whereby a proper positioning of the spots along the spiral 41 can be achieved.

As illustrated in FIG. 2, the typical prior art CD 10 has a spiral 11 with a wobble. More specifically, and as is known to those skilled in the art, the radial position of the track wobbles with a peak to peak wobble spacing of 50 to 60 micrometers along the track, and this wobble represents the carrier signal for the frequency modulated ATIP signal. Thus the wobble of spiral 11 cannot serve as a basis for a proper positioning of the spots used to recreate the hologram since the typical spiral 11 does not offer the precision described above during the time that the spots are being written onto the CD 10. Additionally, the CLV rotation of CD 10 during writing of the spots onto CD 10 is not repeatedly accurate from track-to-track of CD 10. Consequently, the spots can be placed in a track-to-track dithered position far exceeding the bit size. This is detrimental to a reproduction of a hologram 60, because a nature of hologram requires an accurate positioning of the spots on CD 10 due to the required summation of light constructively interfering from the spots. If a spot is more one half wavelength of light from its intended position, the diffracted light will be out of phase from its intended phase and source position, thus destructively interfering with the intended image or contributing to the noise level.

However as FIG. 1 and FIGS. 3 through 7 illustrate, the method of the present invention provides a method that enables the generation of holographic image 60 on a data storage disc.

Figure 3:
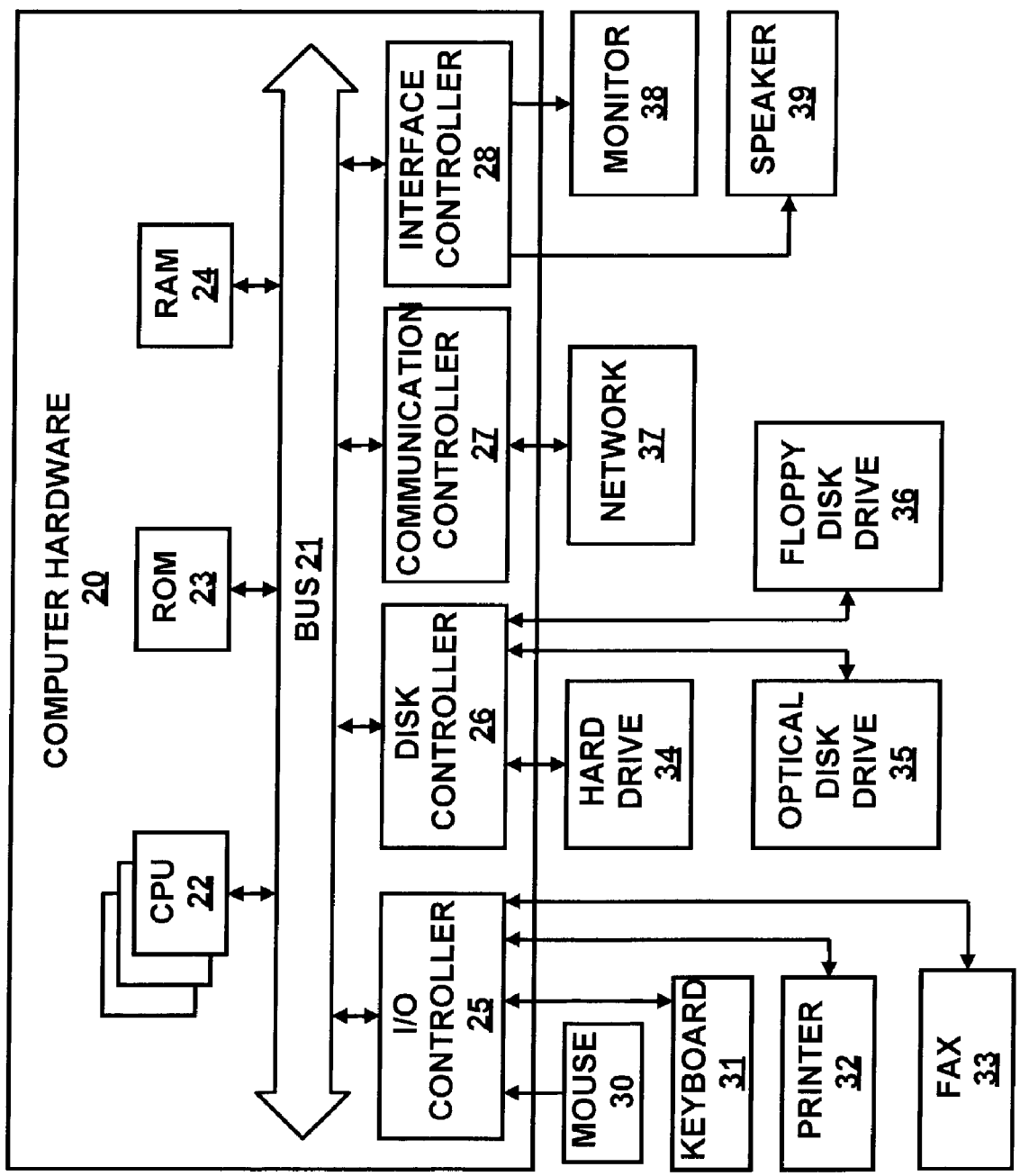
FIG. 3 illustrates a block diagram of a preferred embodiment of a computer system in accordance with the present invention.

In FIG. 3, computer hardware 20 is illustrated in accordance with one embodiment of the present invention. As shown in FIG. 3, computer hardware 20 includes a bus 21 for facilitating electrical communication among one or more central processing units (CPU) 22, a read-only memory (ROM) 23, a random access memory (RAM) 24, an input/output (I/O) controller 25, a disc controller 26, a communication controller 27, and a user interface controller 28.

Each CPU 22 is preferably one of the Intel families of microprocessors, one of the AMD families of microprocessors, one of the Motorola families of microprocessors, or one of the various versions of a Reduced Instruction Set Computer microprocessor such as the PowerPC chip manufactured by IBM. ROM 23 permanently stores various controlling programs such as the Basic Input-Output System (BIOS) developed by IBM. RAM 24 is the memory for loading an operating system and selectively loading the controlling programs.

Controller 25 is an aggregate of conventional controllers for facilitating an interaction between CPU 22 and pointing devices such as a mouse 30 and a keyboard 31, and between CPU 22 and output devices such as a printer 32 and a fax 33. Controller 26 is an aggregate of conventional controllers for facilitating an interaction between CPU 22 and storage devices such as a hard drive 34, an optical drive 35, and a floppy drive 36. The hard drive 34 stores a conventional operating system, such as, for example, IBM's AIX operating system or Microsoft's Windows. Controller 27 is an aggregate of conventional controllers for facilitating an interaction between CPU 22 and network 37. Controller 28 is an aggregate of conventional controllers for facilitating an interaction between CPU 22 and a graphic display device such as a monitor 38, and between CPU 22 and an audio device such as a speaker 39.

Those having ordinary skill in the art will appreciate additional components that may be included within computer hardware 20 in accordance with the principles of the present invention. Those having ordinary skill in the art will also appreciate embodiments of the present invention alternative to computer hardware 20 for implementing the principles of the present invention.

Figure 4A:
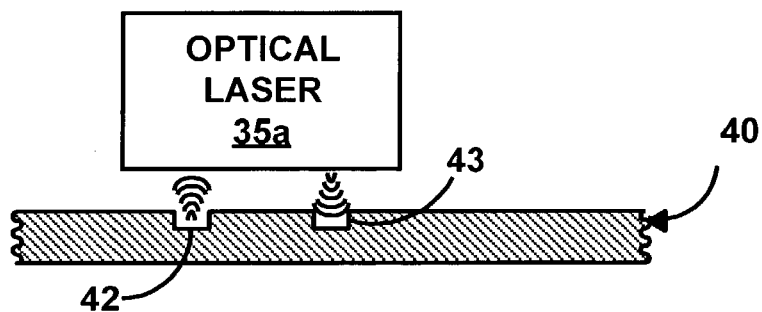
FIG. 4A illustrates a side view of a first exemplary writing of hologram spots onto a cross-sectional view of the optical disc of FIG. 2.

In FIG. 4A, an exemplary writing of a plurality of hologram spots 43 onto the optical disc 40 is illustrated. The optical disc drive 35 (FIG. 3) includes an optical laser 35a capable of emitting light beams to concurrently read data and write data from optical disc 40. Ordinarily, reading and writing operations on an optical disk start from the center and follow the spiral outward to the perimeter. Although this invention may be implemented using the center to perimeter direction, more accuracy may be achieved by starting at the periphery and following the track toward the center. This would require spinning the disk in the opposite direction from the one conventionally used. Indeed, it may be preferred to write from the periphery of disc 40 to the center of disc 40 to capitalize on the potentially greater accuracy afforded by this strategy.

Figure 4B:
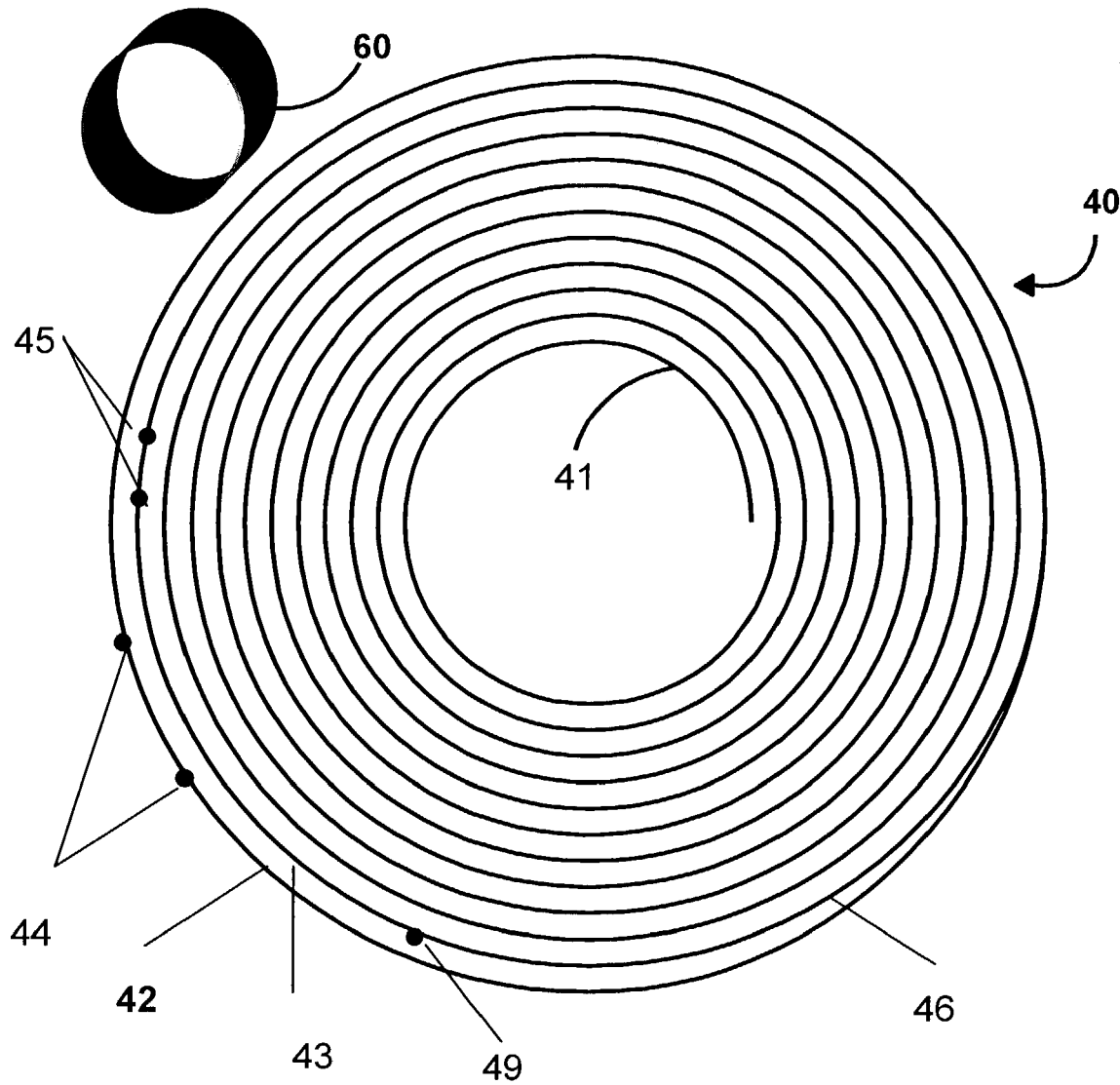
FIG. 4B illustrates a top view of the optical disc of FIG. 2 after a writing of a first set of hologram data as illustrated in FIG. 4A.

For purposes of brevity, however, only the embodiment of a method writing from the periphery to the center is described. Similar methods will be immediately recognizable to those of ordinary skill in the art for writing a holographic image from the center of the disc 40 to the periphery. The optical laser 35a is aligned with the last revolution of the spiral 42 and an adjacent inner revolution of the spiral 43 ("the next revolution") to facilitate a concurrent reading of the calibration spots in track revolution 42 and writing of the hologram spots in track revolution 43 onto the optical disc 40. Thus, the spots on the prior revolution provide calibration information for writing spots on the following revolution. As the spots are written, their precise locations are remembered for use in computing the writing position in the following revolution. From the reading of the calibration spots 44, the optical disc drive 35 ascertains the positions of the calibration spots 44 and writes the hologram spots 45 along the second revolution with a positioning corresponding to the reading of the positions of the calibration spots 44 (i.e., a positioning of the hologram spots 45 to equal to or less than one-half a wavelength of light). The result is the writing of hologram spots 45 as illustrated in FIG. 4B with a proper positioning to accurately contribute to the wavefront produced by the entire hologram. In some cases, hologram spots are not written at particular places on the disc 40, depending on the original image 60. For example, location 46 on the disc 40 may be free of hologram spots 45. From the reading of the calibration spots 44, the optical disc drive 35 ascertains the positions of the calibration spots 44 and may also be able to determine the areas 45 along the second revolution where hologram spots 45 will not be placed.

In one embodiment of the invention, the holographic image 60 is precalculated into a series of locations that indicate where spots should be written along the spiral of the disk. The calibration spots serve to provide accurate angular information about where the laser head 35a is positioned along the spiral. When it is in a position where a spot should be written, it does so. The position is calculated in polar coordinates using r the radial distance from the center that is determined by the revolution number of the spiral and angle $\phi$ that is the angular position determined using the calibration dots. The radial distance can be accurately known by simply counting the revolutions because the spacing of the pregroove spiral tracks can be reliably and repeatably determined by the mold used in the manufacturing process of the disk.

For example, the image 60 may be translated into a sequence of commands which indicate to laser 35 that a hologram spots 45 should be placed at coordinates $(r_1,\phi_1)$, $(r_2,\phi_2), \ldots, (r_n,\phi_n)$ which locate points along the spiral 41 at which to write spots. The coordinates of these points correspond to places on the spiral where the constructive interference from the image wavefront for image 60 exceeds a specified threshold. At other coordinates, no spot is written. In accordance with the present, invention, hologram spots 45 may also be placed onto the surface of disc 40 based on previously placed hologram spots. For example, hologram spot 49 may be placed in relation to hologram spots 45 rather than in relation to calibration spots 44. Again, image 60 may be precalculated into a series of locations that indicate where the spots 45, 49 should be placed. For example, image 60 may be translated into commands that indicate to laser 35 that hologram spot 45 is to be written at coordinate $(r_m, \phi_m)$. This coordinate is determined by knowing the coordinates of prior track spots 44, 45 using interpolation computations.

Figure 5A:
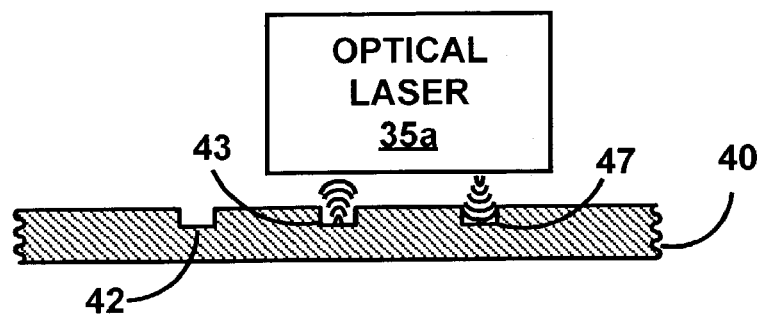
FIG. 5A illustrates a side view of a second exemplary writing of hologram spots onto a cross-sectional view of the optical disc of FIG. 2.
Figure 5B:
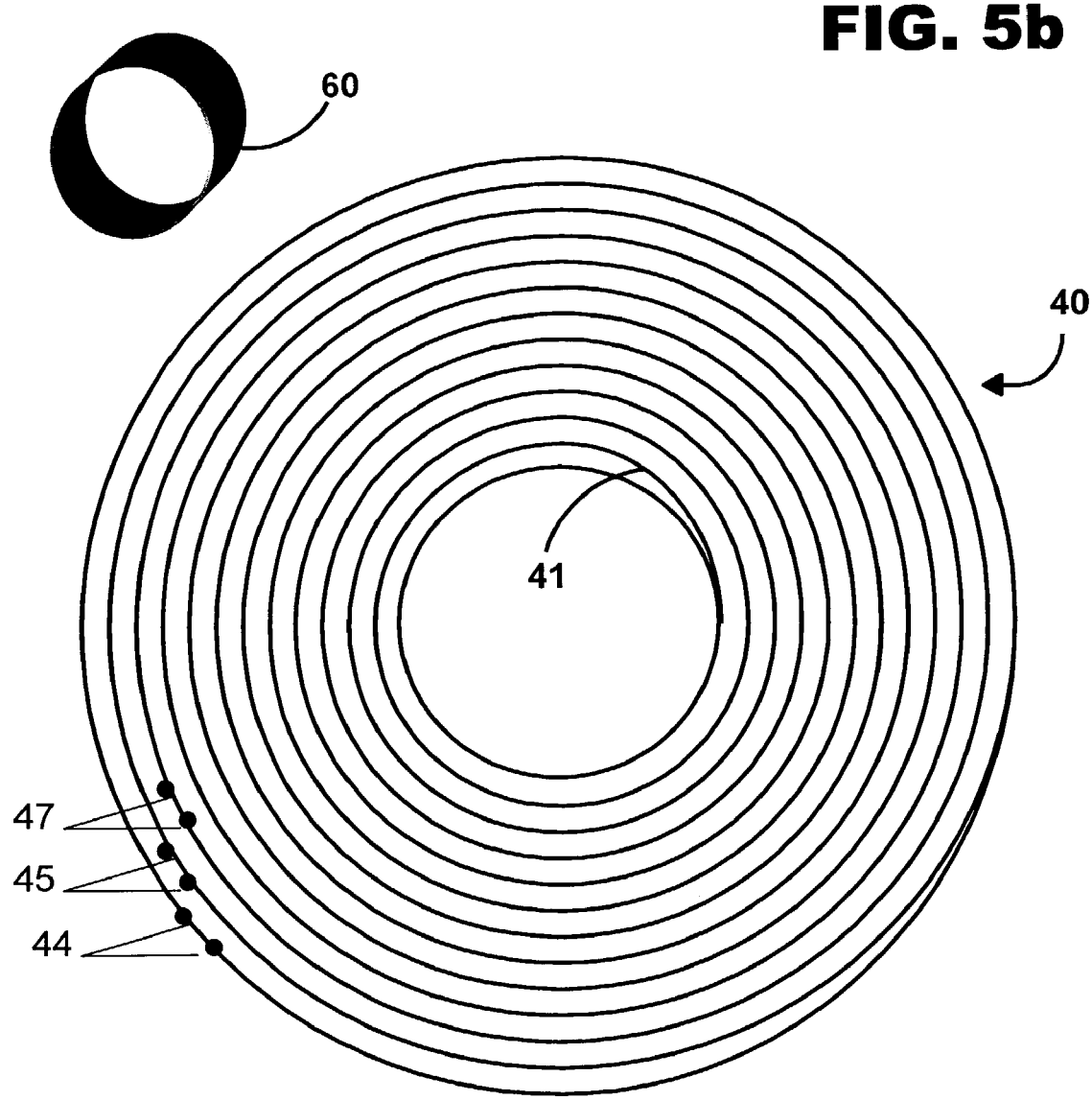
FIG. 5B illustrates a top view of the optical disc of FIG. 2 after a writing of a second set of hologram data as illustrated in FIG. 5A.

In FIG. 5A, an exemplary writing of a plurality of hologram spots 45 onto the optical disc 40 continues. As the method proceeds from the first steps illustrated in FIGS. 4A and 4B where the optical disc is aligned with the first revolution, the laser 35a moves along spiral 41. The optical laser 35a is aligned with the second revolution of the spiral 41 and an adjacent inner revolution of the spiral 41 ("the third revolution") to facilitate a concurrent reading of the hologram spots 45 and writing of the hologram spots 47 onto the optical disc along the third revolution. From the reading of the calibration spots 44, the optical disc drive 35 ascertains positions of the hologram spots 45. The hologram spots 47 being placed along the third revolution having a positioning corresponding to the reading of the positions of the hologram spots 45 (i.e., a positioning of the hologram spots 47 to equal to or less than one-half a wavelength of light). The result is the writing of hologram spots 47 as illustrated in FIG. 5B with a proper positioning to accurately project a portion of the hologram corresponding to the hologram spots 47. Alternatively, the positioning of hologram spots 47 may be based in relation to calibration spots 44 as described above at FIG. 4A.

Figure 6:
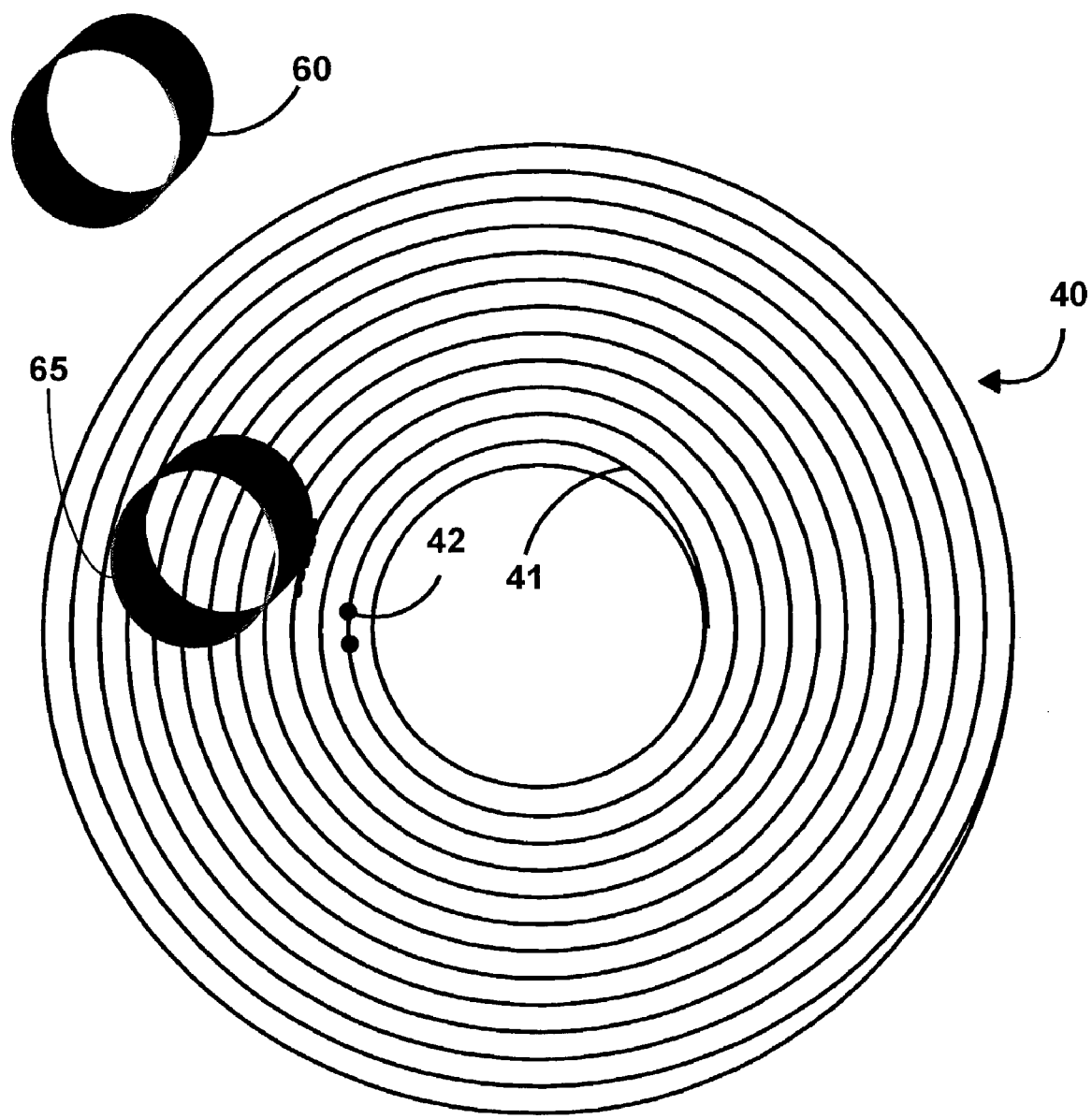
FIG. 6 illustrates a top view of the optical disc of FIG. 2 after a writing of a complete set of hologram data.

As illustrated in FIG. 6, the method may proceed so that the optical laser 35a is aligned with the third revolution of the spiral 41 and an adjacent inner revolution of the spiral 41 ("the fourth revolution") to facilitate a concurrent reading of further hologram spots and so on along the fifth revolution, the sixth revolution, etc. This read/write process is continued for the remaining revolutions of the spiral 41 whereby the result is a set of properly positioned spots for the entire hologram onto the optical disc 40. FIG. 6 illustrates that, when the method of the present invention is completed, a recreation 65 of image 60 is written on the surface on disc 40. The recreation 65 will also be a complete holographic image. FIG. 6 pictures the method in its last iteration, i.e. on the innermost revolution of spiral 41.

The size and positioning of the calibration spots 42, the hologram spots 43, the hologram spots 46 and hologram spots 47 were illustrated above scale for the purposes of facilitating an understanding of the present invention. Those having ordinary skill in the art will appreciate the actual size and the one-half wavelength of light positioning of the calibration spots 42, the hologram spots 43, the hologram spots 46, and the hologram spots 47 is typically undetectable by the human eye. Additionally, those having ordinary skill in the art will appreciate that each calibration spot 42, each hologram spot 43, each hologram spot 46, each hologram spot 47 and other hologram spots not shown as well as the positioning may be undetectable for various reasons, such as, for example, dust on optical disc 40. As such, the optical disc driver 35 is operated to interpolate a positioning of hologram spots being written when a reading of the calibration spots 41 or a reading of previously written hologram spots involves a failure to detect one or more of the spots. In one embodiment, a phased-lock loop technique is implemented to time the positions of each spot being read whereby the optical disc driver 35 can maintain the detected timing when failing to detect one or more of the spots. Those having ordinary skill in the art will further appreciate that interpolation by the optical disc driver 35 is required when the hologram spots 43, the hologram spots 46, and the hologram spots 47 and other hologram spots not shown have a spacing between pairs of spots that by design exceed one-half wavelength of light.

Figure 7:
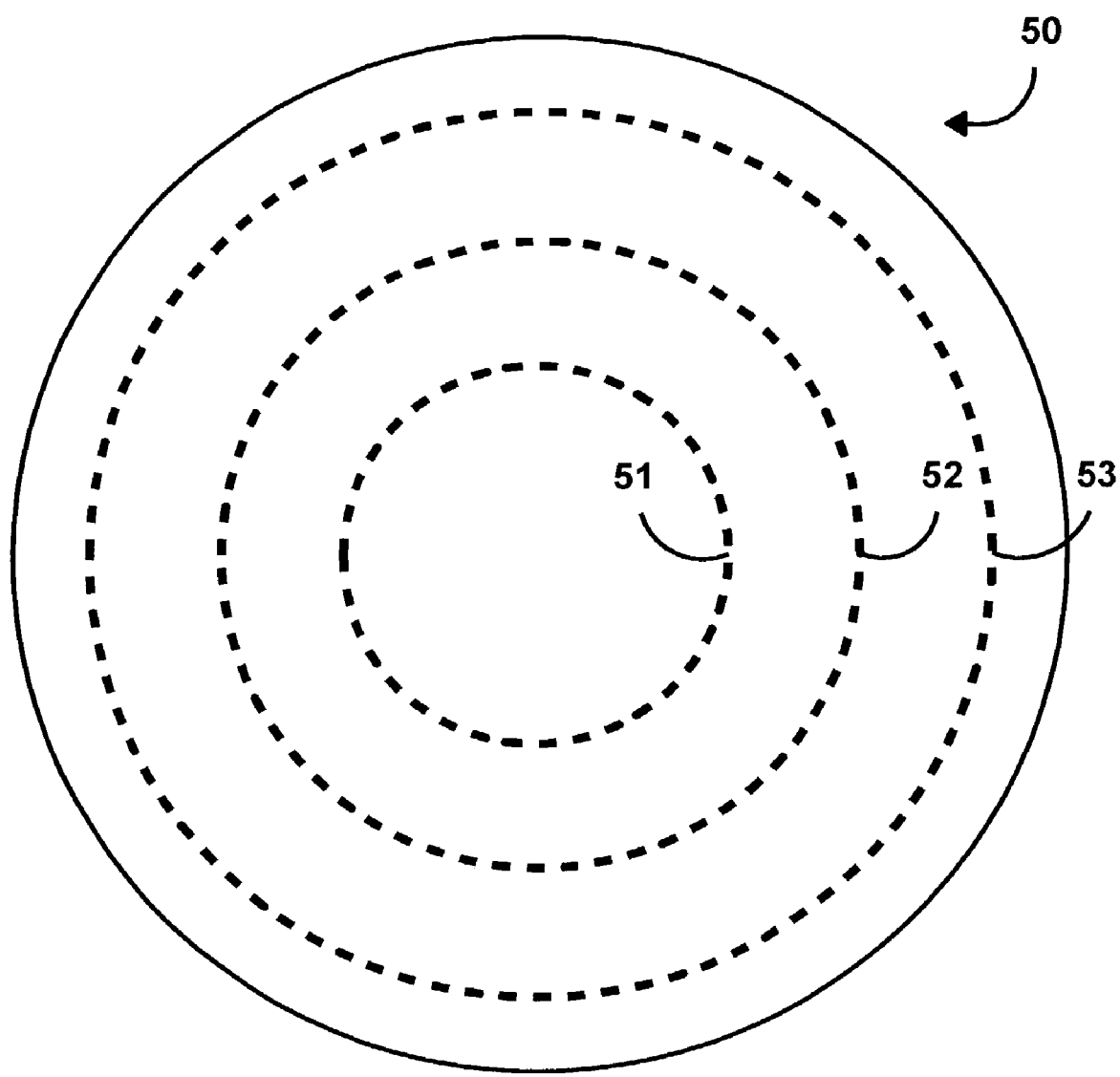
FIG. 7 illustrates a top view of a second embodiment of an optical disc in accordance with the present invention.

In FIG. 7, an optical disc 50 is illustrated in accordance with one embodiment of the present invention. As shown in FIG. 7, to facilitate the reading and writing of data, the optical disc 50 includes one or more annular rings of calibration spots such as, for example, an annular ring of calibration spots 51, an annular ring of calibration spots 52, and an annular ring of calibration spots 53. Preferably, the calibration spots 51, the calibration spots 52, and the calibration spots 53 are stamped on the optical disc 50 by any known technique with the positioning of the calibration spots 51, the calibration spots 52, and the calibration spots 53 being equal to or less than one-half of a wavelength of light. These additional annular rings of calibration spots can reduce the drift in accuracy that might occur when simply using only the first calibration marks.

Figure 8:
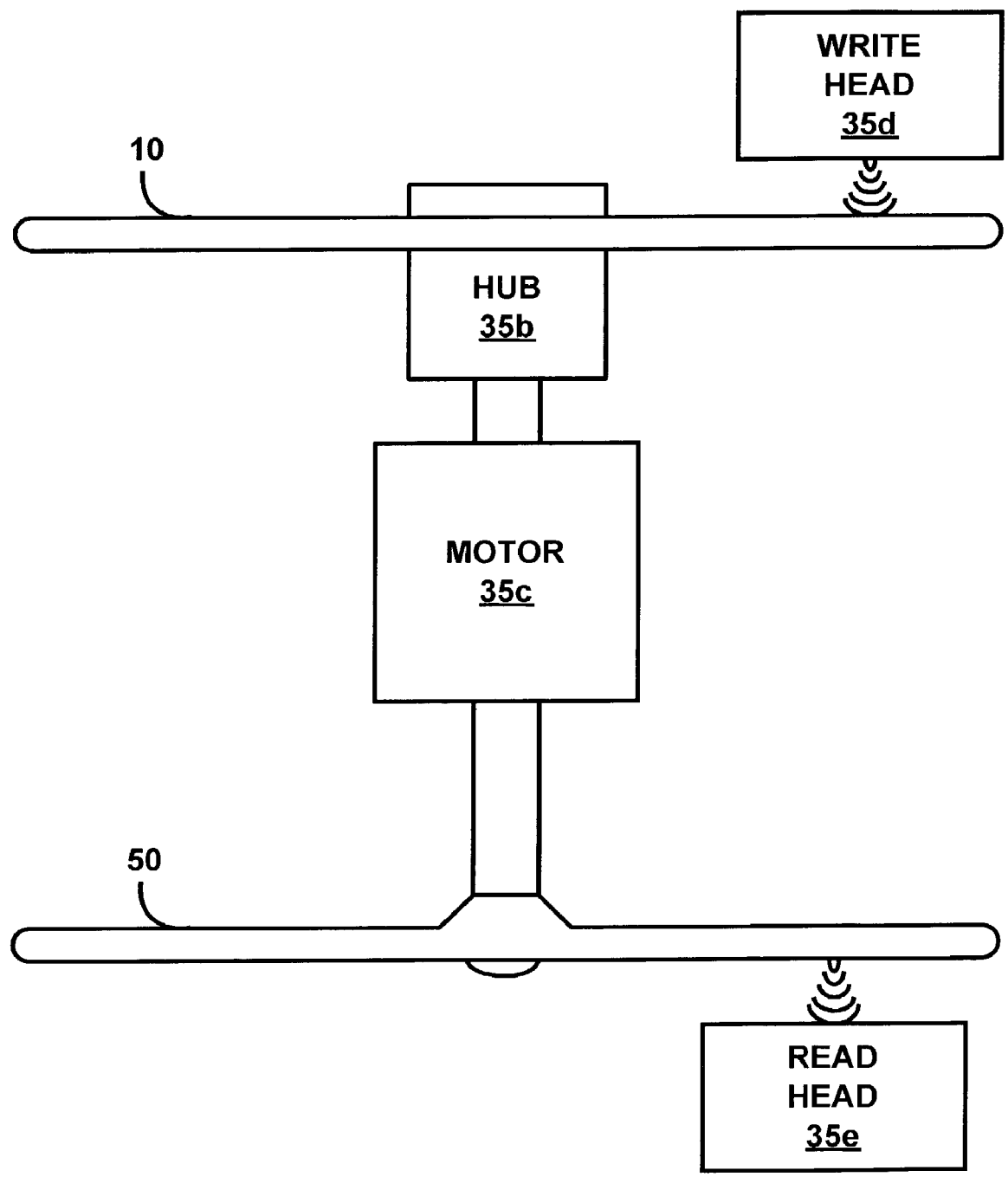
FIG. 8 illustrates a side view of an exemplary writing of hologram spots onto the optical disc of FIG. 7.

In FIG. 8, an exemplary writing of hologram spots onto the optical disc 10 is illustrated. The optical disc drive 35 (FIG. 2) includes a hub holding mechanism 35b and a motor 35c. The hub holding mechanism 35b securely and stably holds the optical disc 10. The motor 35c is mechanically coupled to the hub holding mechanism 35b and the optical disc 50 to thereby synchronize a rotation of the optical disc 10 and the optical disc 50. As the optical disc 10 and the optical disc 50 are rotated, a write head 35d conventionally emits light beams to write the hologram spots (not shown) on the optical disc 10 and a read head 35e conventionally emits light beams to read the calibration spots on the optical disc 50 (not shown) (e.g., calibration spots 53 illustrated in FIG. 7). From the reading of the calibration spots on the optical disc 50, the optical disc drive 35 ascertains the position of the calibration spots and writes the hologram spots on the optical disc 10 with a positioning corresponding to the reading of the positions of the calibration spots (i.e., a positioning of the hologram spots to equal to or less than one-half a wavelength of light). The result is the writing of hologram spots on the optical disc 10 with a proper positioning of spots to accurately project a hologram corresponding to the hologram spots on the optical disc 10. The optical disc driver can selectively employ an interpolation as previously described herein of the calibration spots on the optical disc 50. The addition of a separate calibration disk adds cost to the device due to the extra laser head but increases accuracy greatly. The hub mechanism 35b should be designed to hold the optical disc 10 with sufficient firmness so that the disc does not slip in its angular position. In addition, the acceleration and deceleration of spinning the disc should be controlled to minimize chance of slipping, and thus minimize the change of losing calibration. The calibration disc 50 could be implemented as a cylinder or in any number of other configurations. Disc 10 will still require at least one calibration mark so that its initial angular relationship with respect to disc 50 can be known and so that the exact revolution number of groove 41 can be known.

Although the figures above illustrate the recreation of a holographic image onto a conventional optical disc, the method of the present invention may also be used to recreate a holographic image onto other suitable surfaces. For example, an image may be created onto a glass disc. Alternatively, an image may be recreated onto the surface of a film. In one embodiment of the invention, the film may then be adhered to another surface, such as, for example, the surface of an optical disc. Other embodiments of the invention may involve writing the hologram spots in three dimensions on the volume of the disc to create more diffraction points and provide self-filtering for incident lighting.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method of generating a hologram on a first disc surface, comprising: providing at least one calibration spot on the first disc surface; reading the calibration spot to ascertain the calibration spot positioning; and writing a first set of hologram spots onto a second disc surface based on the calibration spot positioning, the first set of hologram spots being representative of a first portion of the hologram.

2. The method of claim 1, wherein the first disc surface and the second disc surface are the same surface.

3. The method of claim 1 wherein the calibration spot comprises a plurality of calibration dots on the first disc surface, further comprising: writing the first set of hologram spots onto the first disc surface based on the calibration spot positioning, the first set of hologram spots being representative of the first portion of the hologram.

4. The method of claim 1 wherein the first surface is a glass surface with the hologram on the surface, further comprising: writing a first set of hologram spots onto the second disc surface based on the calibration spot positioning, the first set of hologram spots being representative of the first portion of the hologram.

5. The method of claim 1 wherein the first surface and the second surface comprise matching calibration spirals.

6. The method of claim 1, further comprising: reading the first set of hologram spots on the second disc surface to ascertain a first set positioning; and writing a second set of hologram spots onto the second disc surface based on the first set positioning, the second set of hologram spots being representative of a second portion of the hologram.

7. The method of claim 1, further comprising: interpolating the writing of the first set of hologram spots when the calibration spot positioning exceeds one-half a wavelength of light.

8. The method of claim 1 wherein the calibration spot has a calibration spot positioning that is equal to or less than one-half a wavelength of light.

9. A system for generating a hologram on a first disc surface, comprising: a first disc surface, wherein at least one calibration spot is disposed on the first disc surface, the calibration spot having a calibration spot positioning that is equal to or less than one-half a wavelength of light; a disc-writing unit, wherein the disc-writing unit comprises means for writing a first set of hologram spots onto a second disc surface based on the calibration spot positioning, the first set of hologram spots being representative of a first portion of the hologram.

10. The system of claim 9 further comprising: a disc-reading unit, wherein the disc-reading unit comprises means for reading the calibration spot to ascertain the calibration spot positioning.

11. The system of claim 9 wherein the disc-writing unit further comprises means for reading the calibration spot to ascertain the calibration spot positioning.

12. The system of claim 9 wherein the calibration spot is pre-stamped into the first disc surface.

13. The system of claim 9 wherein the disc-writing unit is a laser.

14. The system of claim 9, further comprising: a hub holding mechanism for holding the first disc surface in relation to the second disc surface.

* * * * *